(No Model.) 2 Sheets—Sheet 1.

P. T. HENDRICK.
LAWN MOWER SHARPENER.

No. 536,950. Patented Apr. 2, 1895.

WITNESSES.
Frank G. Parker.
Edward S. Day

INVENTOR.
Patrick Thomas Hendrick (No Model.)  2 Sheets—Sheet 2.
P. T. HENDRICK.
LAWN MOWER SHARPENER.

No. 536,950. Patented Apr. 2, 1895.

WITNESSES.
Frank G. Parker
Edward S. Day

INVENTOR.
Patrick Thomas Hendrick

UNITED STATES PATENT OFFICE.

PATRICK THOMAS HENDRICK, OF ARLINGTON, MASSACHUSETTS.

LAWN-MOWER SHARPENER.

SPECIFICATION forming part of Letters Patent No. 536,950, dated April 2, 1895.

Application filed October 15, 1894. Serial No. 525,964. (No model.)

*To all whom it may concern:*

Be it known that I, PATRICK THOMAS HENDRICK, of Arlington, in the county of Middlesex and State of Massachusetts, have invented certain new and useful Improvements in Lawn-Mower Sharpeners, of which the following, taken in connection with the accompanying drawings, is a specification.

My invention relates to a device for sharpening the knives of a lawn mower of the class in which rotary knives are used, and consists in a frame work adapted to hold the body of the lawn mower firmly in place and to adjustably hold an emery bar in such a position that when the knives of the lawn mower are made to rotate, they will, by coming in contact with the said emery bar, be sharpened, the object being to construct a simple device by the use of which the knives of a lawn mower may be easily sharpened and trued at the same time. This object I attain by means of the mechanism shown in the accompanying drawings, in which—

Figure 1:
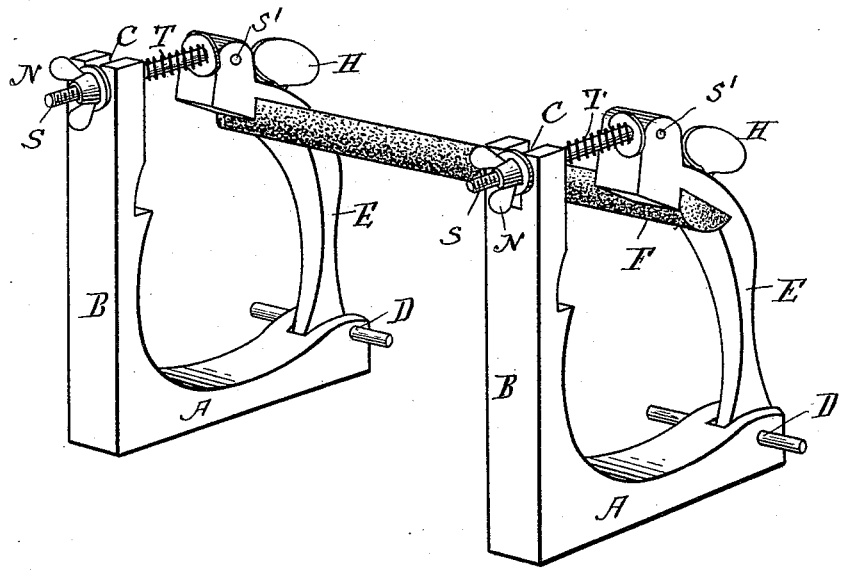
Figure 2:
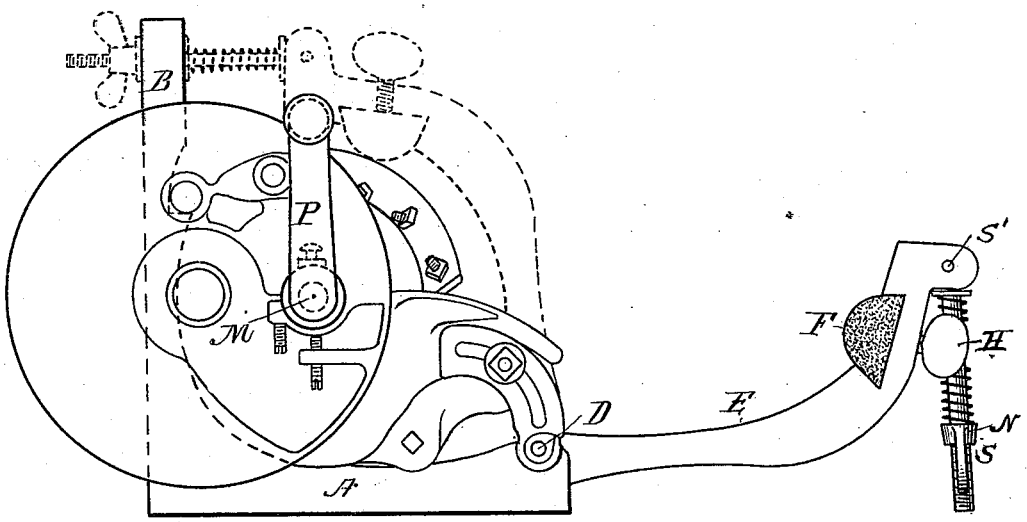
Figure 3:
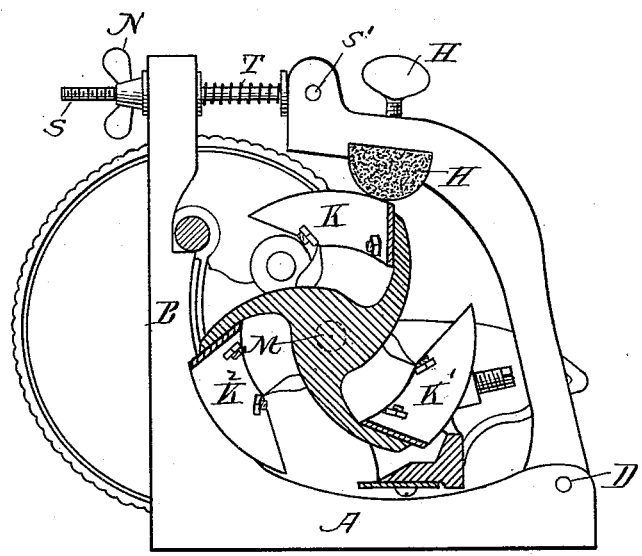

Figure 1 is a view in perspective showing my sharpening device disconnected, with the mowing machine. Fig. 2 is an end elevation showing my device in connection with the mowing machine, the emery bar and its holders being represented as thrown back to admit of placing the mower in the frame. Fig. 3 is an end elevation showing all of the parts as they appear when in operation as a sharpening machine.

It is not necessary to describe the mowing machine as my device is applicable to any of the ordinary rotary mowers in use. In the one selected for illustration M represents the shaft of the knife wheel and K K' K² the knives.

My device consists of two L shaped pieces A B A B to each end of which is attached a swinging arm E pivoted at D and having at its upper end a screw link S connected to the arm at S' by a pivot as shown. The other end of each of the screw links is adapted to engage with a slot C made in the upper end of the arm B of the L shaped pieces A B. Each of the screw links S is provided with thumb nuts N and with a resisting spring T. The emery bar F is attached at its ends to the swinging arms E by any suitable means. That shown in the drawings consists of inserting the bar in a dove-tail recess and fastened therein by set screws H as shown. A crank P is attached to the end of the shaft M for use in turning the knife wheel.

To use my device I proceed as follows: First remove the wooden roller of the lawn mower. It is also better, although not entirely necessary, to remove the long handle. Set the mower in the frame of sharpener, draw the arms E of sharpener containing the emery bar F so that the bar will be directly over the blades of the mower, and insert the screw arm S in the slots in frame. The iron pins connecting the frame and arms F may be used in the roller holes of mower to insure steadiness. Remove the driving wheel of mower at the left side, also the key wheel on blades. Put on the crank P and then adjust the emery bar F by the thumb nuts N on heads of frame so that each blade will touch the emery lightly the entire length of the blade. Turn until each blade shows a good edge.

Should the bottom blade need sharpening, remove the emery bar and use it as a file, using the flat surface of bar.

I claim—

In a lawn mower sharpener, the combination of the L shaped pieces A B A B adapted to hold the lawn mower as described; with the swinging arms E E, mechanism for adjustably connecting them with the said L shaped pieces, and the grinding bar F attached to said swinging arms E E substantially as and for the purpose set forth.

In testimony whereof I have signed my name to this specification, in the presence of two subscribing witnesses, on this 9th day of October, A. D. 1894.

PATRICK THOMAS HENDRICK.

Witnesses:
FRANK G. PARKER,
EDWARD S. DAY.